(12) United States Patent
Beaujot et al.

(10) Patent No.: US 9,924,627 B1
(45) Date of Patent: Mar. 27, 2018

(54) MODULAR METERING APPARATUS FOR AN AIR SEEDER

(71) Applicant: SEEDMASTER MANUFACTURING LTD., Emerald Park (CA)

(72) Inventors: Norbert Beaujot, Emerald Park (CA); Daniel Michaluk, Emerald Park (CA)

(73) Assignee: SeedMaster Manufacturing Ltd., Emerald Park, SK (CA)

( * ) Notice: Subject to any disclaimer, the term of this patent is extended or adjusted under 35 U.S.C. 154(b) by 0 days.

(21) Appl. No.: 15/494,689

(22) Filed: Apr. 24, 2017

(30) Foreign Application Priority Data

Oct. 7, 2016 (CA) .................................. 2944655

(51) Int. Cl.
| | |
|---|---|
| *B65G 53/14* | (2006.01) |
| *A01C 7/04* | (2006.01) |
| *G01F 13/00* | (2006.01) |

(52) U.S. Cl.
CPC ............ *A01C 7/042* (2013.01); *G01F 13/001* (2013.01)

(58) Field of Classification Search
CPC .... B65G 53/14; B65G 31/04; B65G 53/4646; A01D 41/1217; A01C 7/081; A01C 7/082; A01C 7/163
USPC ........... 406/63, 65, 67, 68, 71, 92, 123, 144; 222/367, 636; 198/640, 642
See application file for complete search history.

(56) References Cited

U.S. PATENT DOCUMENTS

| | | | | |
|---|---|---|---|---|
| 4,815,400 A | * | 3/1989 | Hall ........................ | A01C 15/04 111/174 |
| 4,842,449 A | * | 6/1989 | Nelson .................. | A01C 15/003 141/65 |
| 4,899,672 A | * | 2/1990 | Paul ........................ | A01C 7/20 111/170 |
| 5,947,040 A | * | 9/1999 | Gregor .................... | A01C 7/081 111/174 |
| 6,089,795 A | * | 7/2000 | Booth ....................... | B60P 1/42 209/133 |
| 6,138,591 A | * | 10/2000 | Horsch ................... | A01C 7/081 111/178 |
| 6,213,289 B1 | * | 4/2001 | Hay ......................... | F04D 1/00 198/642 |
| 6,230,636 B1 | | 5/2001 | Bom et al. | |

(Continued)

OTHER PUBLICATIONS

PAMI Report Valmar Model 4400 Fertilizer Attachment, Mar. 1986, 5 pages.

*Primary Examiner* — Joseph Dillon, Jr.
(74) *Attorney, Agent, or Firm* — Nixon & Vanderhye P.C.

(57) ABSTRACT

A granular material handling apparatus has a metering assembly comprises a metering module removably mounted in an opening in a hopper. The metering module comprises a meter roller and a front metering member with a metering edge parallel to and at a fixed metering gap distance from the meter roller. A removable flow structure receives granular material flowing over the metering edge and directs same into a distribution assembly mounted under the material metering assembly and comprising venturi devices spaced along the hopper under the metering module and an air supply conduit. Each venturi device is connected to the air supply conduit and is adapted at an output end thereof for connection to a distribution conduit, and defines a product input opening. The flow structure is operative to direct the received granular material substantially equally into each of the product input openings.

20 Claims, 11 Drawing Sheets

(56) References Cited

U.S. PATENT DOCUMENTS

| | | | | |
|---|---|---|---|---|
| 6,491,479 B1* | 12/2002 | Rexius | ............... | A01C 7/081 406/139 |
| 8,353,644 B2* | 1/2013 | Dunlop | ............... | B60P 1/00 406/144 |
| 9,702,103 B2* | 7/2017 | Wendorff | ............... | E01H 10/007 |
| 2001/0013309 A1* | 8/2001 | Mayerle | ............... | A01C 7/102 111/174 |
| 2006/0042529 A1* | 3/2006 | Johnson | ............... | A01C 7/081 111/175 |
| 2012/0042815 A1* | 2/2012 | Wonderlich | ............... | A01C 7/107 111/174 |
| 2012/0132115 A1* | 5/2012 | Dean | ............... | A01C 7/081 111/14 |
| 2012/0272880 A1* | 11/2012 | Georgison | ............... | A01C 7/081 111/175 |
| 2014/0049395 A1* | 2/2014 | Hui | ............... | A01C 7/081 340/608 |
| 2015/0296703 A1* | 10/2015 | Audigie | ............... | A01C 7/081 222/637 |
| 2016/0021815 A1* | 1/2016 | Redman | ............... | A01C 7/20 111/149 |
| 2016/0128270 A1* | 5/2016 | Ruppert | ............... | A01M 9/0053 239/68 |
| 2016/0135359 A1* | 5/2016 | Kowalchuk | ............... | A01C 7/102 111/149 |
| 2016/0205866 A1* | 7/2016 | Funck | ............... | A01C 7/081 |
| 2016/0205867 A1* | 7/2016 | Montag | ............... | A01C 15/04 |
| 2017/0142895 A1* | 5/2017 | Henry | ............... | A01C 7/081 |
| 2017/0196162 A1* | 7/2017 | Sheppard | ............... | A01C 19/02 |

\* cited by examiner

MODULAR METERING APPARATUS FOR AN AIR SEEDER

CROSS-REFERENCE TO RELATED APPLICATIONS

This application claims priority to CA Patent Application No. 2,944,655 filed Oct. 7, 2016, the entire content of which is hereby incorporated by reference.

This disclosure relates to the field of agricultural implements and in particular a removable modular metering apparatus for an air seeder.

BACKGROUND

Air seeders typically include an implement frame mounted on wheels, with a plurality of furrow openers mounted on the frame. The furrow openers can be moved from a raised non-operative position to a lowered operating position where the furrow openers engage the ground and create furrows. Agricultural products such as seed and various types of fertilizer are carried in separate tanks which can be mounted on the implement frame or on a cart towed along with the implement frame.

Metering devices dispense products from the tanks into one or more air streams that carry the products through a network of hoses and manifolds to the furrow openers where same are deposited in the furrows. Although it is still common to meter two separate products, such as seed and a fertilizer, into a single air stream for delivery to a single furrow, most modern air seeders also have distribution networks that deliver one product or combination of products into one furrow and another product or combination thereof into a different furrow. For example seed is delivered to seed furrows and fertilizer to separate fertilizer furrows.

These may be comprise separate furrow openers mounted on separate shanks, such as mid row fertilizer banding furrow openers which are remote from the seed furrow openers, or combination furrow opener where a single shank supports a furrow opening tool that makes one furrow for seed and a separate furrow for fertilizer. There are also then two separate distribution networks, one delivering product from selected ones of the tanks to the seed furrows, and one delivering product from selected ones of the tanks to the fertilizer furrows.

In one typical type of air seeder a metering roller, auger, or the like dispenses product from each tank into an air stream. To accomplish this the tanks must be sealed and pressurized and a conduit generally connects the air stream to the top of the interior of the tank to pressurize the tank so that there is no pressure differential between the tank and the air stream which would put back pressure on the product as it is being metered into the air stream.

In a second type of air seeder, the tanks are not sealed and pressurized, but instead the product is metered into a venturi system such as disclosed for example in U.S. Pat. No. 6,230,636 to Bom et al.

Valmar Airflo of Elie, Manitoba, Canada manufactures implements for metering granular products from a tank through a venture into an air stream.

SUMMARY OF THE INVENTION

The present disclosure provides a metering apparatus that overcomes problems in the prior art.

In a first embodiment the present disclosure provides a granular material metering and distribution apparatus comprising a material metering assembly and a distribution assembly. The material metering assembly comprises a hopper with a bottom hopper opening and a metering module removably mounted in the bottom hopper opening. The metering module comprises a meter roller oriented substantially horizontally and configured such that when granular material is placed in the hopper, the granular material is in contact with a rear side of the meter roller. The meter roller defines a plurality of recesses on an outer surface thereof and is driven such that during operation a bottom side of the meter roller moves forward. A front metering member is mounted forward of a lower portion of the meter roller and provides a metering edge that is parallel to the outer surface of the meter roller and spaced at a fixed metering gap distance from the outer surface of the meter roller. A bottom plate extends forward from the hopper under the meter roller to the front metering member and is configured to contain granular material such that granular material moves out of the hopper only over the metering edge. A removable flow structure is operative to receive granular material flowing over the metering edge and to direct the received granular into the distribution assembly. The distribution assembly is mounted under the material metering assembly and comprises a plurality of venturi devices attached to a bottom portion of the hopper and spaced along the bottom hopper opening under the metering module and an air supply conduit carrying pressurized air. Each venturi device is connected at an air input end thereof to the air supply conduit and is adapted at an output end thereof for connection to a distribution conduit, and each venturi device defines a product input opening between the air input end thereof and the output end thereof. The flow structure is operative to direct the received granular material substantially equally into each of the product input openings.

In a second embodiment the present disclosure provides an air seeder tank system configured for travel in an operating travel direction. The system comprises a main product tank with a main feed aperture in a bottom of the main product tank, and a plurality of material metering assemblies, each material metering assembly comprising a hopper with a bottom hopper opening, and a metering module removably mounted in the bottom hopper opening. The metering module comprises a meter roller oriented substantially horizontally and configured such that when granular material is placed in the hopper, the granular material is in contact with a rear side of the meter roller. The meter roller defines a plurality of recesses on an outer surface thereof and is driven such that during operation a bottom side of the meter roller moves forward. A front metering member is mounted forward of a lower portion of the meter roller and provides a metering edge that is parallel to the outer surface of the meter roller and spaced at a fixed metering gap distance from the outer surface of the meter roller. A bottom plate extends forward from the hopper under the meter roller to the front metering member and is configured to contain granular material such that granular material moves out of the hopper only over the metering edge. A removable flow structure is operative to receive granular material flowing over the metering edge and to direct the received granular into a distribution assembly. The plurality of material metering assemblies includes right and left main material metering assemblies with hoppers thereof attached to corresponding right and left bottom sides of the main product tank and configured to receive granular material from the main feed aperture. Right and left distribution assemblies are mounted under the corresponding right and left main material metering assemblies, each distribution assembly comprising a plurality of venturi devices attached to a bottom portion of the corresponding hopper and spaced along the corresponding bottom hopper opening under the corresponding metering module and an air supply conduit carrying pressurized air. Each venturi device is connected at an air input end thereof to the air supply conduit and is connected at an output end thereof to a distribution conduit, and each venturi device defines a product input opening between the air input end thereof and the output end thereof. The corresponding flow structure is operative to direct the received granular material substantially equally into each of the corresponding product input openings. The air supply conduit of the right distribution assembly is connected to the air supply conduit of the left distribution assembly such that pressurized air flows through the air supply conduits of both the right and left distribution assemblies. A right main meter drive is operative to selectively rotate the meter roller of the right main material metering assembly, and a left main meter drive is operative to selectively rotate the meter roller of the left main material metering assembly.

The granular material metering and distribution apparatus of the present disclosure facilitates cleaning granular material from the hopper when changing from one granular material to another by providing a material metering assembly with a removable metering module. The metering modules are interchangeable and each provides a metering edge spaced at a selected fixed metering gap distance from the outer surface of the selected meter roller which defines a selected size, type, and configuration of recesses. In contrast to adjustable meter rollers of the prior art, the lack of any adjustment increases the precision of the metering rate by reducing the possibility that the metering gap distance might be wrongly set, or might change during operation. To accommodate different granular materials with different sized granules, and different ranges of metering rates, a wide variety of interchangeable metering modules can be provided each with its particular meter roller, recesses, and metering gap distance.

The distribution assembly of the presently disclosed granular material metering and distribution apparatus also allows different products to be directed into the same set of distribution conduits. A plurality of granular material metering and distribution apparatus may provide a desired degree of sectional control by mounting a plurality of apparatuses across the bottom of a product tank. Each apparatus can be configured to meter granular material into a relatively small number of distribution conduits to feed a corresponding number of furrow openers, and then the required number of apparatuses is mounted to the product tank to service the number of furrow openers required. For further versatility, some of the output ends of the venturi devices can be blocked off if there are more venturi devices than distribution conduits.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
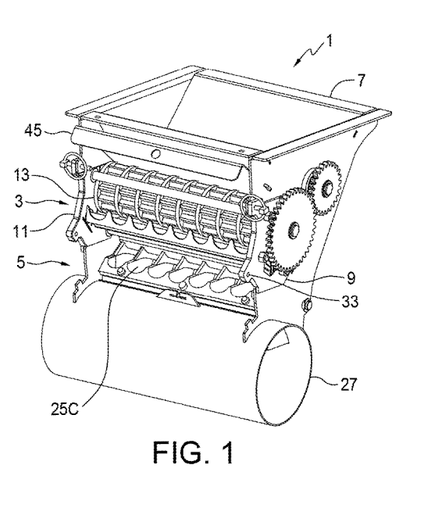
FIG. 1 is a perspective view of an embodiment of a granular material metering and distribution apparatus of the present disclosure with the flow structure removed for illustration.
Figure 1A:
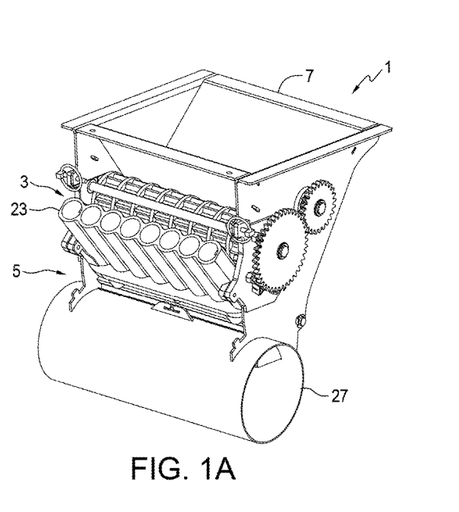
FIG. 1A is a perspective view of the embodiment of FIG. 1 with the flow structure installed.

FIG. 1 illustrates an embodiment of a granular material metering and distribution apparatus 1 of the present disclosure. The apparatus 1 comprises a material metering assembly 3 and a distribution assembly 5.

The material metering assembly 3 comprises a hopper 7 with a bottom hopper opening 9, and a metering module 11 removably mounted in the bottom hopper opening 9. The bottom hopper opening 9 can be seen more clearly in FIG. 8 where the metering module 11 is removed.

Figure 2:
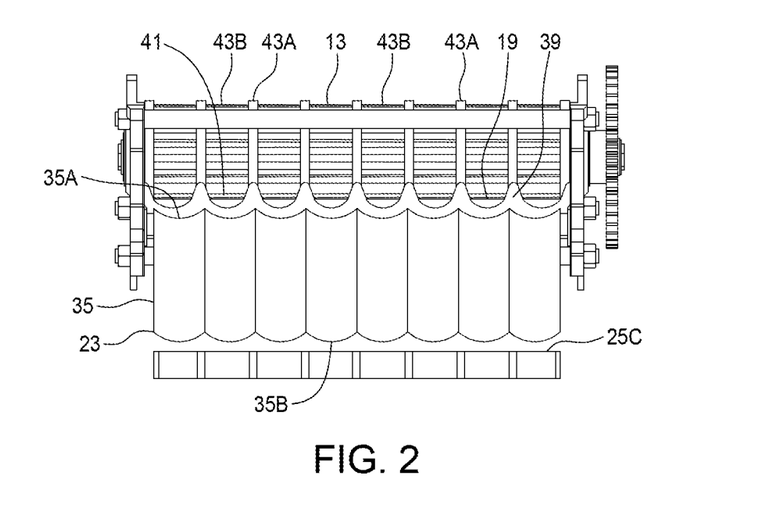
FIG. 2 is a front view of the metering module of the embodiment of FIG. 1 with the troughs of the flow structure schematically illustrated.
Figure 3:
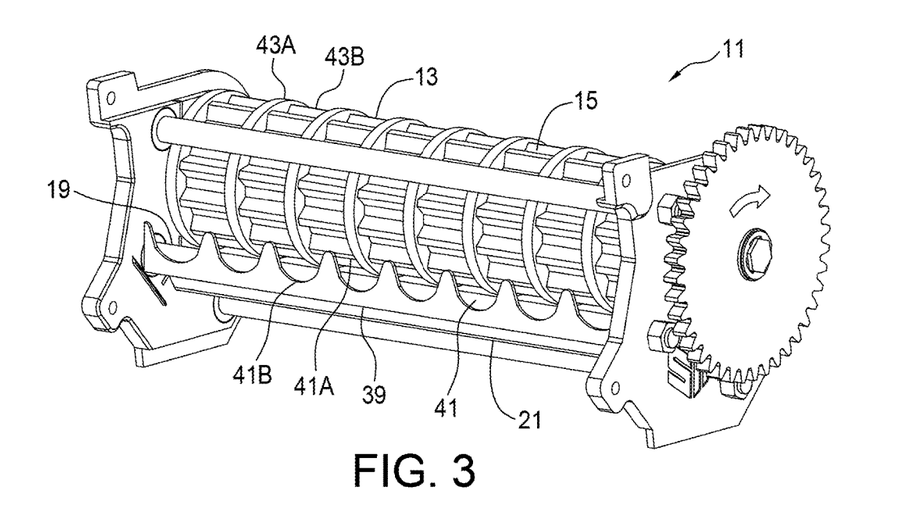
FIG. 3 is a perspective view of the metering module of the embodiment of FIG. 1.
Figure 4:
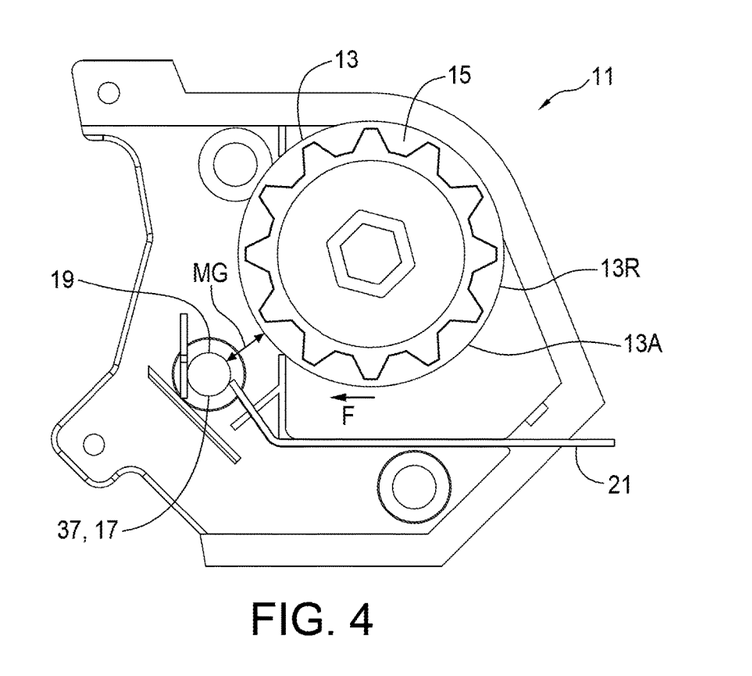
FIG. 4 is a side view of the metering module of the embodiment of FIG. 1.

The metering module 11, further illustrated in FIGS. 2-4, comprises a meter roller 13 oriented substantially horizontally and configured such that when granular material is placed in the hopper 7, the granular material is in contact with a rear side 13R of the meter roller 13. The meter roller 13 defines a plurality of recesses 15 on an outer surface 13A thereof and is driven such that during operation a bottom side of the meter roller moves forward in direction F. During operation granular material is carried forward from the rear side 13R of the meter roller 13 in direction F and over a front metering member 17 mounted forward of a lower portion of the meter roller 13.

Figure 5:
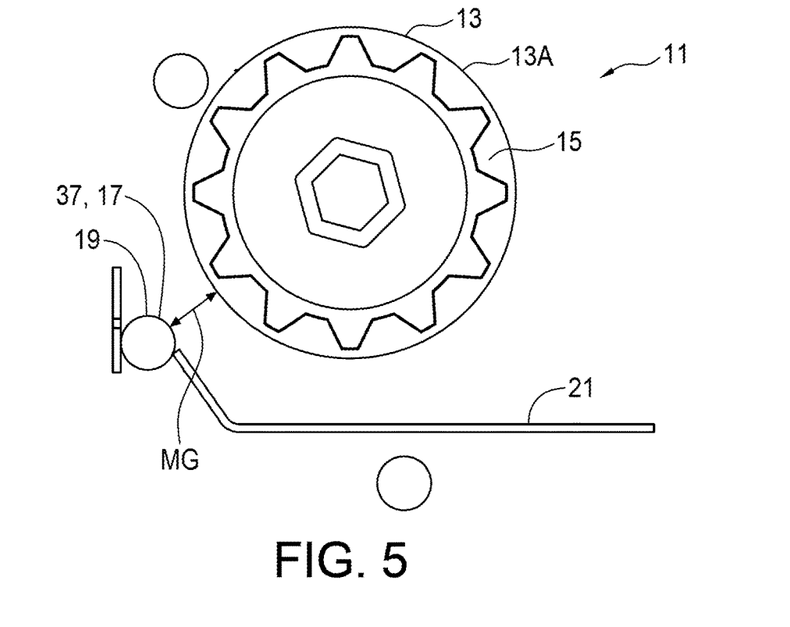
FIG. 5 is a schematic side view of the metering module of the embodiment of FIG. 1.

FIG. 4 is a side view of the metering module 11 while FIG. 5 is a side view schematically illustrating only the operative elements of the metering module 11. The top of the front metering member 17 provides a metering edge 19 that is parallel to the outer surface 13A of the meter roller 13 and is spaced at a fixed metering gap distance MG from the outer surface 13A of the meter roller 13. A bottom plate 21 extends forward from the hopper 7 under the meter roller 13 to the front metering member 17 and is configured to contain granular material such that granular material moves out of the hopper 7 only over the metering edge 19 when the metering module 11 is in place in the bottom hopper opening 9 and does not leak out the bottom hopper opening 9.

Figure 5A:
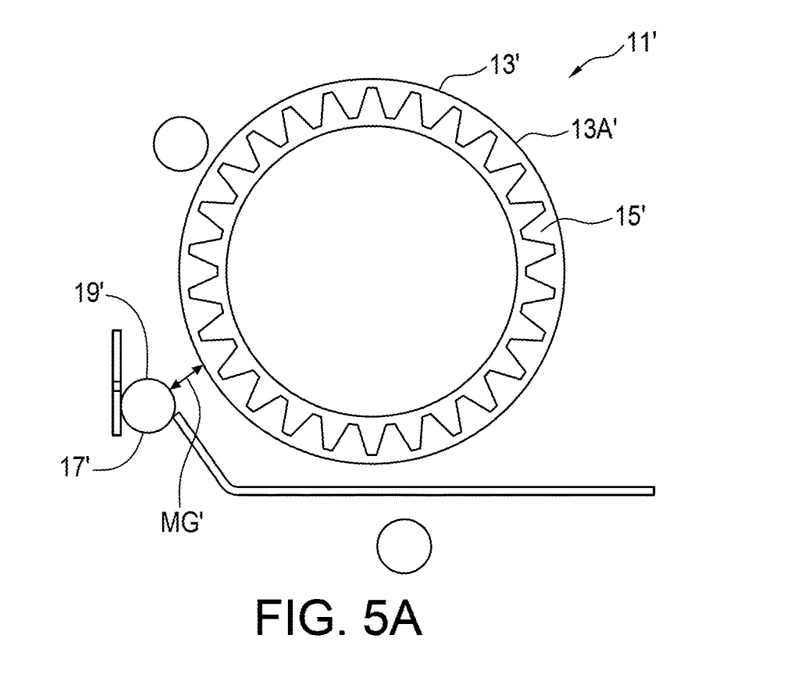
FIG. 5A is a schematic side view of a second configuration of a metering module for use with the embodiment of FIG. 1.

FIG. 5A schematically illustrates the operative elements of an alternate second metering module 11' that could be used for a granular material with different sized granules, or where a different range of metering rates was desired. The second metering module 11' has a second meter roller 13' defining a plurality of second recesses 15' on an outer surface 13A' thereof and a front metering member 17' providing a metering edge 19' spaced at a second metering gap distance MG' from the outer surface 13A' of the second meter roller 13'. It is contemplated that suitable combinations of meter rollers, recesses, and metering gap distances can be found to suit a wide variety of granule sizes and metering rates ranges.

Figure 6:
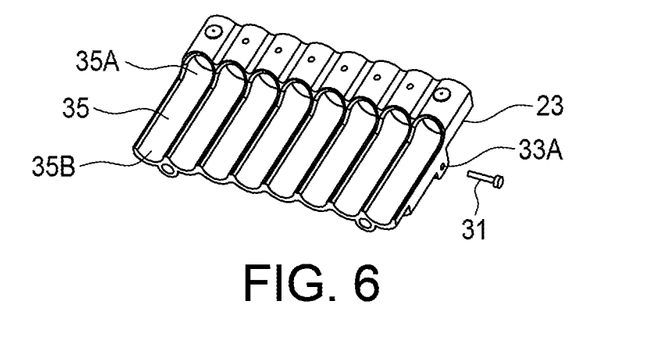
FIG. 6 is a perspective view of the flow structure for use with the embodiment of FIG. 1.

A removable flow structure 23, illustrated in FIG. 6, is operative to receive granular material flowing over the metering edge 19 and to direct the received granular into the distribution assembly 5.

Figure 7:
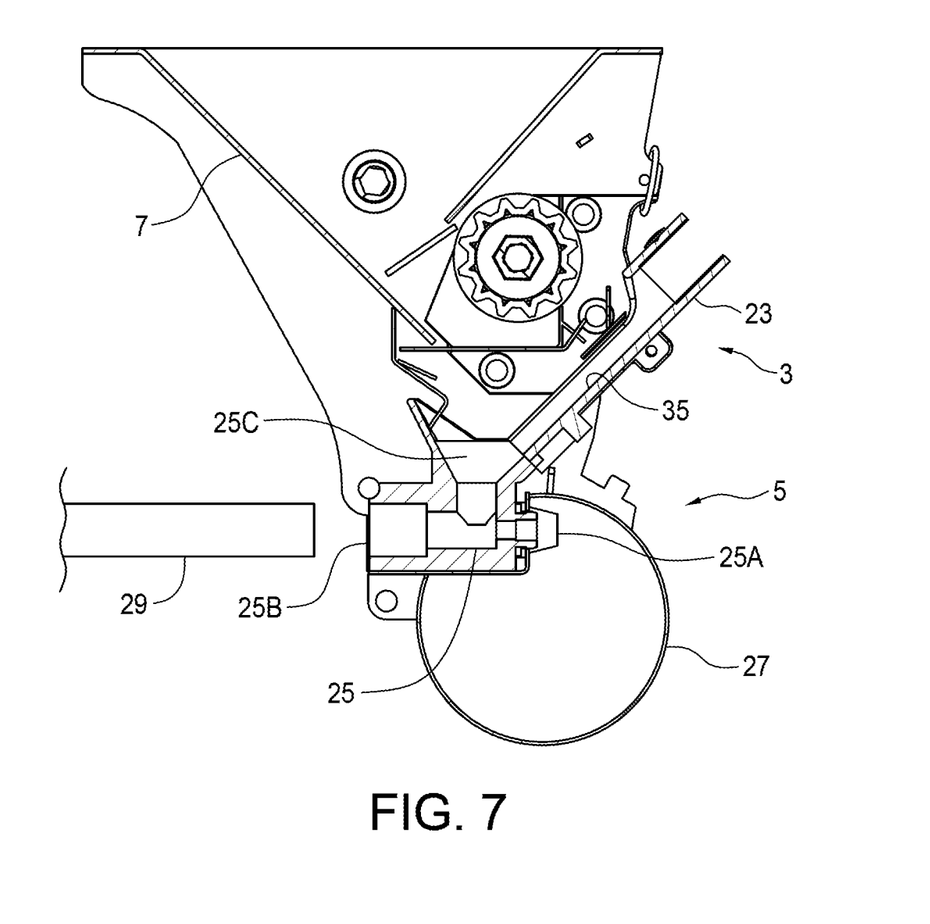
FIG. 7 is a schematic sectional side view of the embodiment of FIG. 1.

As further illustrated in FIG. 7, the distribution assembly 5 is mounted under the material metering assembly 3 and comprises a plurality of venturi devices 25 attached to a bottom portion of the hopper 7 and spaced along the bottom hopper opening 9 under the metering module 11, and an air supply conduit 27 carrying pressurized air. Each venturi device 25 is connected at an air input end 25A thereof to the air supply conduit 27 and is adapted at an output end 27B thereof for connection to a distribution conduit 29. Each venturi device 25 also defines a product input opening 25C between the air input end 25A thereof and the output end 25B thereof.

The flow structure 23 is operative to direct the received granular material substantially equally into each of the product input openings 25C. As is known in the art of venturi devices, when pressurized air is present in the air supply conduit 27, an air stream moves through each venturi device 25 from the air input end 25A to the output end 27B thereof, and creates suction at the product input opening 25C. Thus granular material deposited at the product input openings 25C is drawn into the venturi device 25 where same is carried out the output end 25B of the venturi device and through a connected distribution conduit 29 by the air stream.

The flow structure 23 is removably attached to the metering module 11 by pins 31 through corresponding pin holes 33 in the metering module 11 and the flow structure 23. The flow structure 23 is operative to direct the received granular material substantially equally into each of the product input openings 25C. The illustrated flow structure 23 comprises a corrugated plate defining a plurality of troughs 35, each trough 35 having an upper end 35A oriented to receive granular material flowing over the metering edge 19 and a lower end 35B oriented to direct granular material into a corresponding one of the product input openings 25C.

In the illustrated metering module 11 the front metering member 17 is provided by a cylindrical rod 37, and the metering edge 19 is provided by a top edge of the rod 37 such that granular material flows over the rod 37 and forward down the surface of the rod 37. A guide plate 39 is attached to a front side of the rod 37 and extends upward. The guide plate 39 defines a plurality of generally U-shaped openings 41, each having a bottom end 41B forward of and below the top metering edge 19 of the rod 37, and an open upper end 41A. As seen in FIGS. 2 and 3, each U-shaped opening 41 is aligned with the upper end 35A of a corresponding trough 35, such that granular material flowing over the top metering edge 19 of the rod 37 flows through the U-shaped openings 41 and is guided into the troughs 35.

The outer surface 13A of the meter roller 13 comprises alternating blank portions 43A with no recesses 15 and metering portions 43B defining the recesses 15, such that each metering portion 43B is between two blank portions 43A and each blank portion 43A is between two metering portions 43B, and the metering portions 43B are the same size. The recesses 15 are arranged identically in each metering portion 43B so that as the meter roller 13 rotates, the same amount of granular material is metered by each metering portion 43B. As seen in FIG. 2, each metering portion 43B is aligned with a U-shaped opening 41 and the corresponding trough 35 such that granular material moved over the metering edge 19 by one of the metering portions 43B falls into a corresponding trough 35 and down the trough to the corresponding product input opening 25C.

Figure 8:
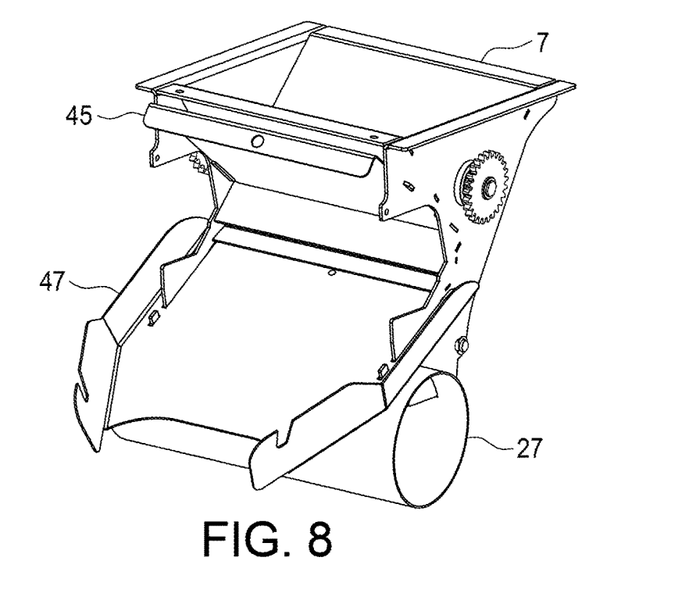
FIG. 8 is a perspective view of the embodiment of FIG. 1 with the metering module removed and the clean out tray attached with the gate in the closed position.
Figure 9:
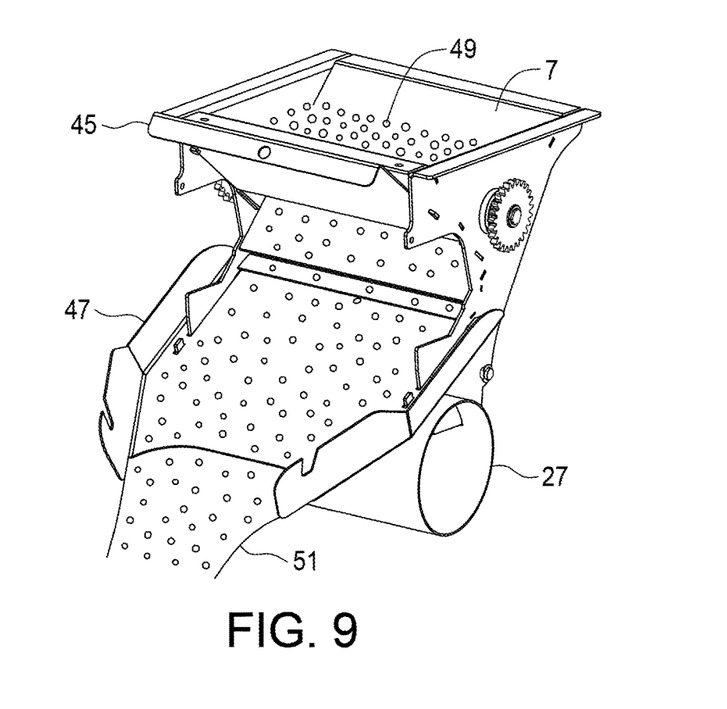
FIG. 9 is a perspective view of the embodiment of FIG. 1 with the metering module removed and the clean out tray attached with the gate in the open position showing granular material flowing down the clean out tray.

A gate 45 is movable, when the metering module 11 is mounted in the bottom hopper opening 9 as seen in FIG. 1, from an open position out of the bottom hopper opening 9, as seen in FIG. 9 where the metering module 11 is removed from the bottom hopper opening 9, to a closed position blocking the bottom hopper opening 9 seen in FIGS. 1 and 8. When the metering module 11 is removed from the bottom hopper opening 9 with the gate 45 in the closed position of FIGS. 1 and 8, the gate 45 prevents granular material from flowing out of the hopper 7 through the bottom hopper opening 9.

With the metering module 11 removed, a clean out tray 47 can be attached in the bottom hopper opening 9 with the gate 45 in the closed position. The clean out tray 47 is configured to direct granular material 49 that is released from the hopper 7 by moving the gate 45 from the closed position of FIG. 8 toward the open position of FIG. 9, into a narrow stream 51 for collection by a bucket or like container.

Figure 10:
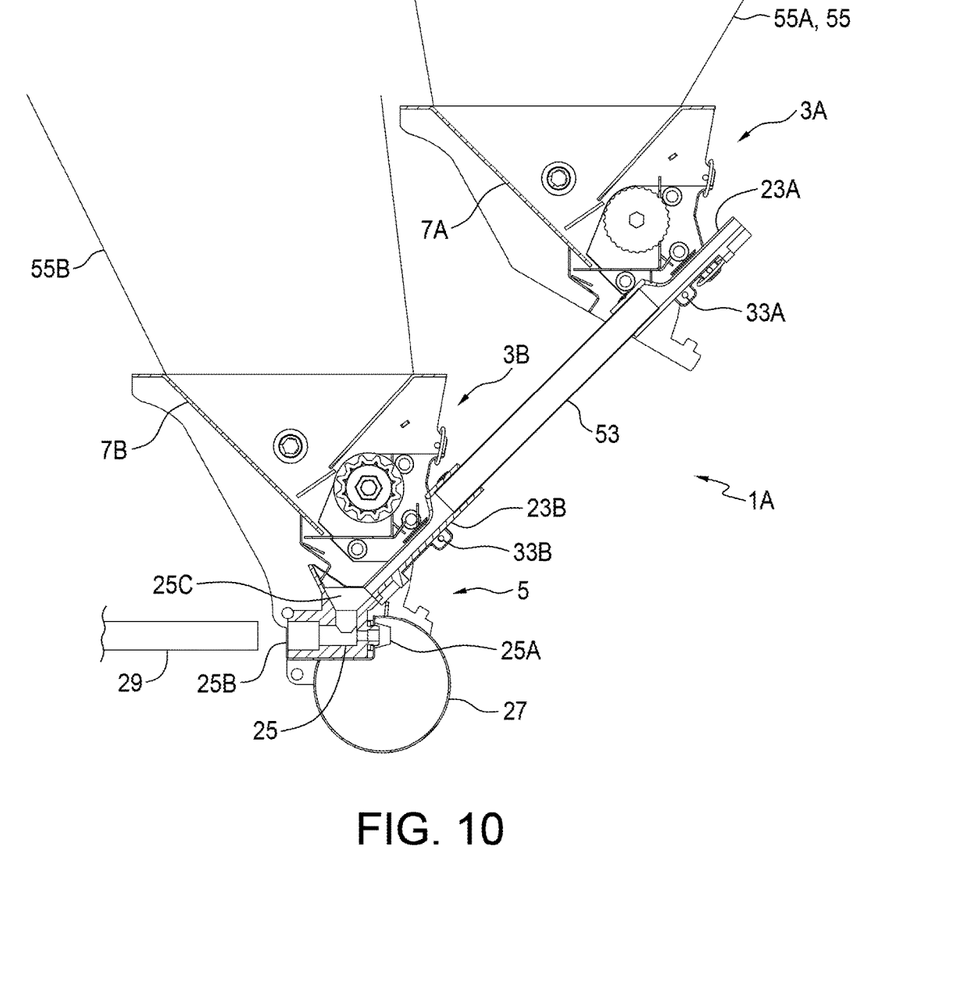
FIG. 10 is a schematic cut away side view of a granular material metering and distribution apparatus comprising the embodiment of FIG. 1 attached to a product tank with an upper material metering assembly located above the lower material metering assembly, and tubes directing granular material from flow structure of the upper material metering assembly into the flow structure of the embodiment of FIG. 1 and then into the distribution assembly of the embodiment of FIG. 1.
Figure 11:
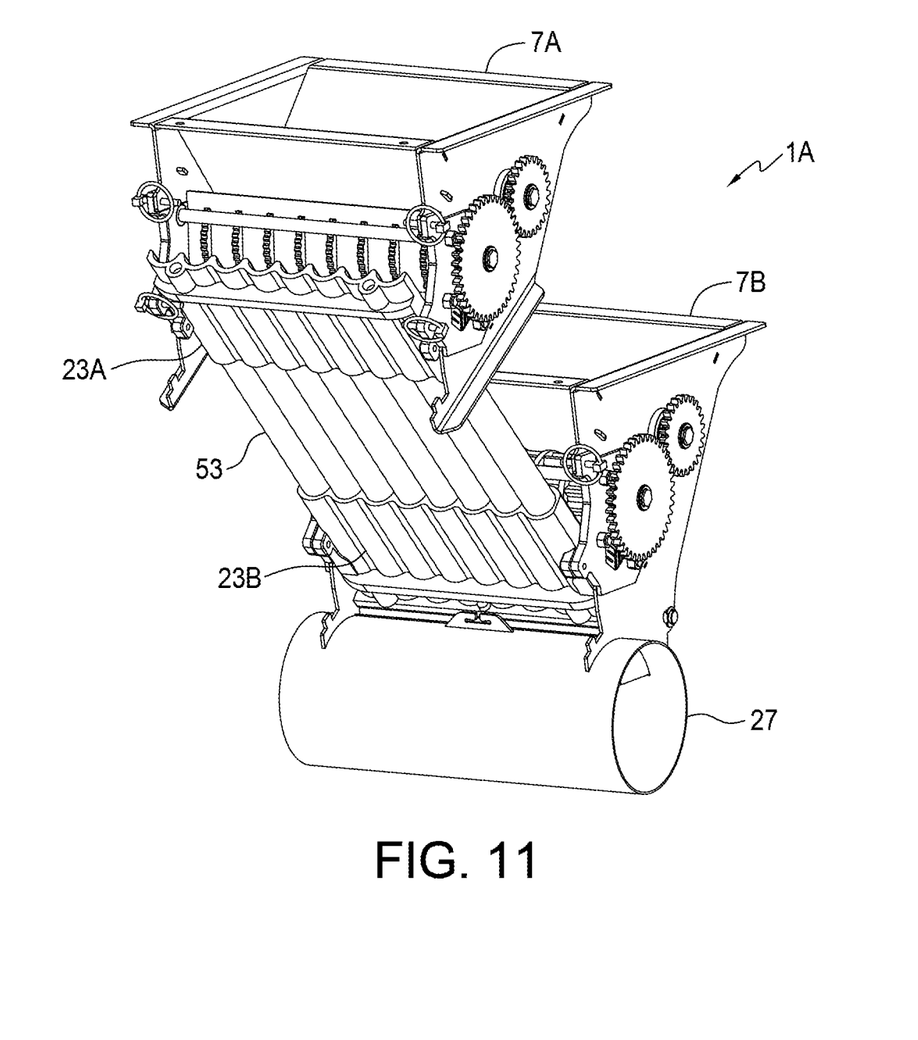
FIG. 11 is a perspective view of the granular material metering and distribution apparatus shown in FIG. 10.
Figure 12:
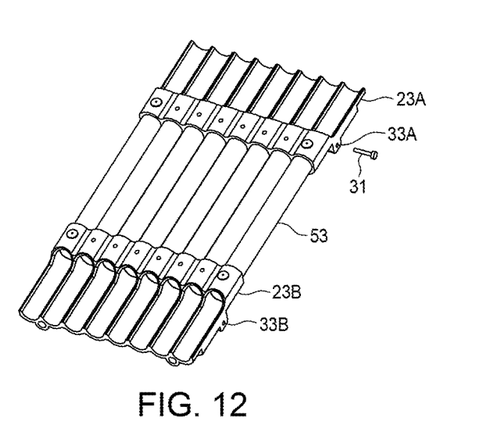
FIG. 12 is a perspective view of the flow structure of the upper material metering assembly, the flow structure of the lower material metering assembly of the embodiment of FIG. 1, and the tubes attached together to form a flow unit.

FIGS. 10 and 11 illustrate a granular material metering and distribution apparatus 1A with a lower material metering assembly 3B and an upper material metering assembly 3A located above the lower material metering assembly 3B. The venturi devices 25 of the distribution assembly 5 are attached to the bottom portion of the hopper 7B of the lower material metering assembly 3B. The flow structure 23A of the upper material metering assembly 3A directs received granular into the product input openings 25C of the distribution assembly 5 through a connector structure 53, comprising tubes as illustrated, or troughs, or the like, connecting the flow structure 23A of the upper material metering assembly 3A to the flow structure 23B of the lower material metering assembly 3B. The connector structure 53 is attached to the flow structure 23A of the upper material metering assembly 3A and to the flow structure 23B of the lower material metering assembly 3B to form the removable flow connecting assembly shown in FIG. 12 that can be attached and removed by maneuvering pins 31 into and out of corresponding pin holes 33A, 33B.

The hoppers 7A, 7B of the upper and lower material metering assemblies 3A, 3B of the apparatus 1A, are typically mounted to the bottom of upper and lower product tanks 55A, 55B, with each product tank 55 carrying a different agricultural product such as seed, fertilizer, inoculant, and the like. The apparatus 1A allows a first granular material in the upper product tank 55A to be metered into the distribution assembly 5 at a selected rate, and a second different granular material in the lower product tank 55B to be metered into the distribution assembly 5 at a different selected rate, with both the first and second granular materials being mixed and fed into a distribution conduit 29 attached to the output end 25B of the venturi device 25.

Figure 13:
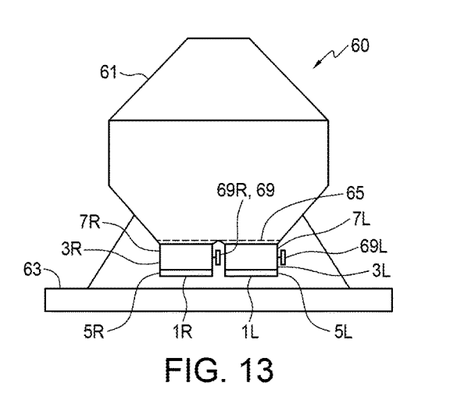
FIG. 13 is a schematic front view of an air seeder tank and metering apparatus with a product tank mounted on an air seeder and right and left embodiment of the granular material metering and distribution apparatus\ of FIG. 1 attached to the bottom of the product tank.
Figure 14:
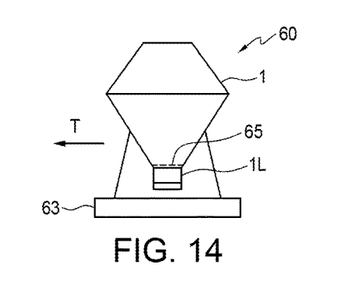
FIG. 14 is a schematic side view of the air seeder tank and metering apparatus of FIG. 13.

FIGS. 13 and 14 schematically illustrate an air seeder tank and metering apparatus 60 with a product tank 61 mounted on an air seeder 63 and configured for movement along the ground in an operating travel direction, and a feed aperture 65 in a bottom of the product tank 61. Right and left granular material metering and distribution apparatuses 1R, 1L are attached to the bottom of the product tank 61.

The hopper 7R of the right material metering assembly 3R is attached to a right side of the bottom of the product tank 61 and is configured to receive granular material from the feed aperture 65, and the right distribution assembly 5R is mounted under the right material metering assembly 3R. Similarly the hopper 7L of the left material metering assembly 3L is attached to a left side of the bottom of the product tank 61 and is configured to receive granular material from the feed aperture 65, and the left distribution assembly 5L is mounted under the right material metering assembly 3L.

Figure 15:
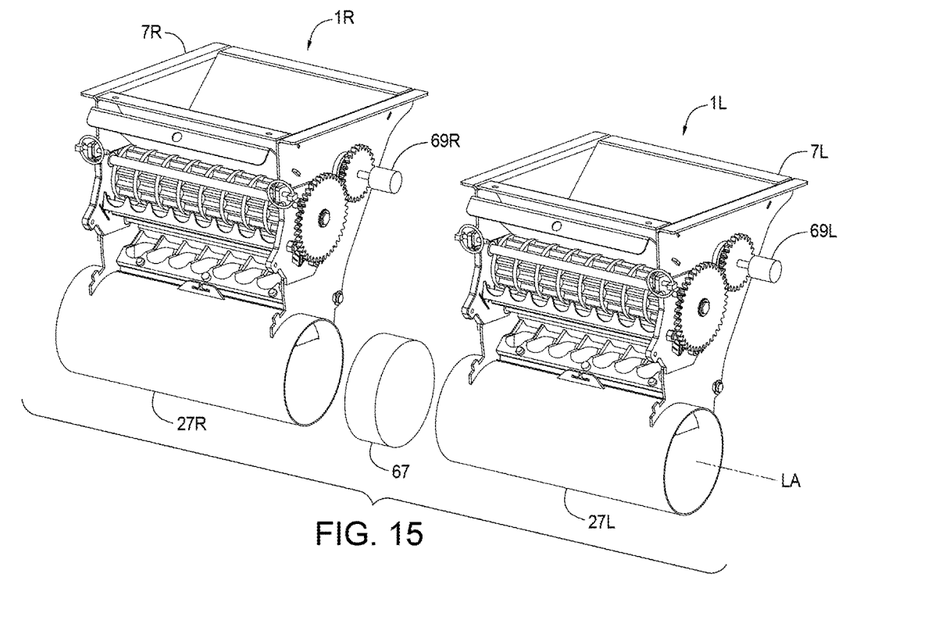
FIG. 15 is a perspective view of two of the embodiment of FIG. 1 shown in side by side relationship such as in preparation for installation in the air seeder tank and metering apparatus of FIG. 13, and a sleeve for connecting the air supply conduits thereof together.

The right and left granular material metering and distribution apparatuses 1R, 1L are shown side by side in FIG. 15. The air supply conduits 27R, 27L of the right and left material metering assemblies 3R, 3L are attached to the corresponding hoppers 7R, 7L with longitudinal axes LA thereof aligned. When brought together under the product tank 61 the air supply conduits 27R, 27L are connected together by a sleeve 67 such that pressurized air flows through the air supply conduits 27R, 27L of both the right and left distribution assemblies 5R, 5L. In the illustrated air seeder tank and metering apparatus 60, a fan is connected to one end or the other of the connected air supply conduits 27R, 27L to provide the necessary pressurized air.

A right meter drive 69R is operative to selectively rotate the meter roller of the right material metering assembly 3R and a left meter drive 69L is operative to selectively rotate the meter roller of the left material metering assembly 3L. This allows one section of the air seeder to be turned off while the other is operating, thereby avoiding excessive overlap. It is contemplated that several granular material metering and distribution apparatuses 1 can be mounted side by side under a single product tank 61 to provide a corresponding number of independently operated sections. The meter drives 69 can be electric motors, clutches connecting the meter rollers to a rotating shaft, or like drive mechanisms as are known in the art.

Figure 16:
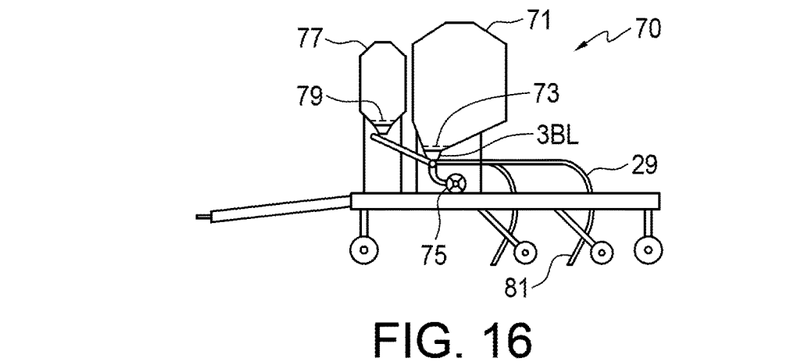
FIG. 16 is a schematic side view of an air seeder tank system with right and left upper material metering assemblies mounted to receive granular material from a secondary product tank and right and left embodiments of the granular material metering and distribution apparatus of Fig. mounted to receive granular material from a main product tank.
Figure 17:
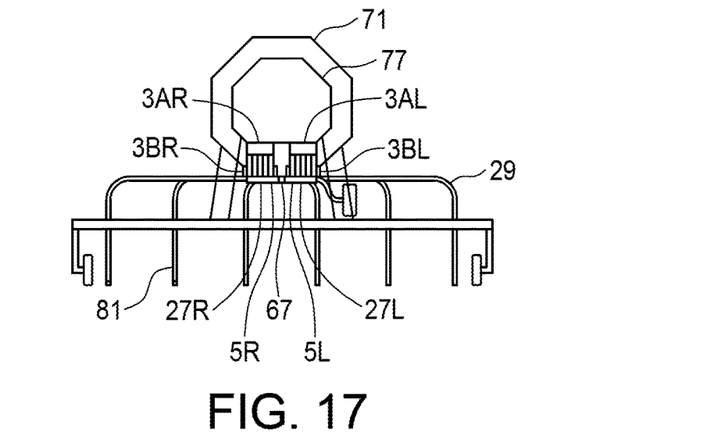
FIG. 17 is a schematic front view of the air seeder tank system shown in FIG. 16.

FIGS. 16 and 17 schematically illustrate an air seeder tank system 70 for travel in an operating travel direction T. The system 70 comprises a main product tank 71 and a main feed aperture 73 in a bottom of the main product tank 71. Hoppers of right and left main material metering assemblies 3BR, 3BL are attached to corresponding right and left bottom sides of the main product tank 71 and configured to receive granular material from the main feed aperture 73. The meter rollers of the right and left main material metering assemblies 3BR, 3BL are driven by separate drives so each can be rotated or stopped independent of the other.

The flow structures of the right and left main material metering assemblies 3BR, 3BL direct metered main granular material from the main product tank 71 into right and left distribution assemblies 5R, 5L mounted under the corresponding right and left main material metering assemblies 3BR, 3BL, and the main granular material from the main product tank 71 is fed through the venturi devices into the air stream and through distribution conduits 29 connected to the output ends of the venturi devices of the right and left distribution assembly 5R, 5L.

Air supply conduits 27R, 27L of the right and left distribution assemblies 5R, 5L are connected by a sleeve 67 such that pressurized air provided by a fan 75 flows through both air supply conduits 27R, 27L.

The air seeder tank system 70 also comprises a secondary product tank 77 with a secondary feed aperture 79 in a bottom thereof and the hoppers of right and left secondary material metering assemblies 3AR, 3AL are attached to corresponding right and left bottom sides of the secondary product tank 77 and configured to receive secondary granular material from the secondary feed aperture 73.

The right and left secondary material metering assemblies 3AR, 3AL are mounted above the corresponding right and left main material metering assemblies 3BR, 3BL and the flow structures 23AR, 23AL of each of the right and left secondary material metering assemblies 3AR, 3AL are operative to direct the secondary granular material from the secondary product tank 77 substantially equally into each of the product input openings of the venturi devices in the corresponding right and left distribution assemblies 5R, 5L using tubes 53 as shown in FIG. 10, where same is fed through the venturi devices into the air stream where same is mixed with the main granular material and passes through the distribution conduits 29 to furrow openers 81.

Figure 18:
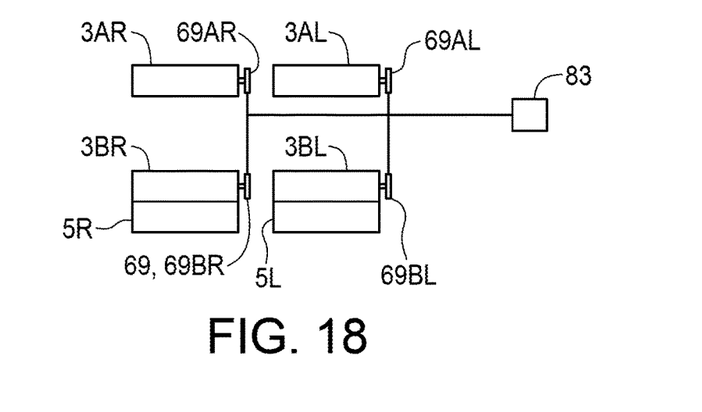
FIG. 18 is a schematic front view of the meter drives and meter drive controller of the air seeder tank system shown in FIG. 16.

It is typically desired with an air seeder tank system 70 such as illustrated and described to have sectional control across the width of the air seeder implement to reduce overlap in a field by stopping product flow through the distribution conduits attached to one or the other of the right and left distribution assemblies 5R, 5L. To accomplish this sectional control, as schematically illustrated in FIG. 18, a meter drive control 83 is connected to the right and left main meter drives 69BR, 69BL and to the right and left secondary meter drives 69AR, 69AL. The meter drive control 81 controls each meter drive 69 individually and is configured, when in a first mode to provide sectional control, to operate the right main and secondary meter drives 69BR, 69AR together, and to operate the left main and secondary meter drives 69BL, 69AL together, independent of each other.

Depending on the nature of the main and secondary granular materials it may also be desired to vary the metering rate, or stop metering altogether, of one granular material independent of the other. The meter drive controller 83 is thus also configured, when in a second mode, to operate the right and left main meter drives meter drives 69BR, 69BL together, and to operate the right and left secondary meter drives 69AR, 69AL together, independent of each other.

The granular material metering and distribution apparatus 1 of the present disclosure provides a material metering assembly 3 with a removable metering module 11 that facilitates cleaning granular material from the hopper 7 when changing from one granular material to another. The metering module 11 provides a metering edge 19 spaced at a fixed metering gap distance MG from the outer surface 13A of the meter roller 13. The lack of any adjustment reduces the possibility that the metering gap distance MG might be wrongly set, or change during operation, as can be the case with prior art systems where the metering gap is adjustable to accommodate different granular materials, with different sized granules, and different metering rates. Instead to accommodate different granular materials with different sized granules, and different ranges of metering rates, a wide variety of interchangeable metering modules 11 can be provided each with its particular meter roller 13, recesses 15, and metering gap distance MG.

The distribution assembly 5 of the presently disclosed granular material metering and distribution apparatus 1 also allows different products to be directed into the same set of distribution conduits. A plurality of granular material metering and distribution apparatus 1 may provide a desired degree of sectional control by mounting a plurality of apparatuses 1 across the bottom of a product tank. Each apparatus 1 can be configured to meter granular material into 6 or 8 distribution conduits 29 to feed a corresponding number of furrow openers 81, and then the required number of apparatuses 1 mounted to the product tank to service the number of furrow openers required. For further versatility, some of the output ends 25B of the venturi devices 25 at one end of the distribution assembly 5 can be blocked off if there are more venturi devices than distribution conduits 29, and the meter roller 13 changed to a corresponding length.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A granular material metering and distribution apparatus comprising:
    a material metering assembly and a distribution assembly;
    wherein the material metering assembly comprises a
        hopper with a bottom hopper opening and a metering module removably mounted in the bottom hopper opening, the metering module comprising:
        a meter roller oriented substantially horizontally and configured such that when granular material is placed in the hopper, the granular material is in contact with a rear side of the meter roller;
        the meter roller defining a plurality of recesses on an outer surface thereof and driven such that during operation a bottom side of the meter roller moves forward;
        a front metering member mounted forward of a lower portion of the meter roller and providing a metering edge that is parallel to the outer surface of the meter roller and spaced at a fixed metering gap distance from the outer surface of the meter roller;
        a bottom plate extending forward from the hopper under the meter roller to the front metering member and configured to contain granular material such that granular material moves out of the hopper only over the metering edge; and
        a removable flow structure operative to receive granular material flowing over the metering edge and to direct the received granular into the distribution assembly;
    wherein the distribution assembly is mounted under the material metering assembly and comprises a plurality of venturi devices attached to a bottom portion of the hopper and spaced along the bottom hopper opening under the metering module and an air supply conduit carrying pressurized air, wherein each venturi device is connected at an air input end thereof to the air supply conduit and is adapted at an output end thereof for connection to a distribution conduit, and each venturi device defines a product input opening between the air input end thereof and the output end thereof, and wherein the flow structure is operative to direct the received granular material substantially equally into each of the product input openings.

2. The apparatus of claim 1 wherein the flow structure comprises a corrugated plate defining a plurality of troughs, each trough having an upper end oriented to receive granular material flowing over the metering edge and a lower end oriented to direct granular material into a corresponding one of the product input openings.

3. The apparatus of claim 2 wherein the front metering member is provided by a cylindrical rod, and the metering edge is provided by a top edge of the rod.

4. The apparatus of claim 3 comprising a guide plate attached to a front side of the rod and extending upward, the guide plate defining a plurality of generally U-shaped openings, each U-shaped opening having a bottom end forward of and below the top edge of the rod, and an open upper end, each U-shaped opening aligned with the upper end of a corresponding trough.

5. The apparatus of claim 2 wherein the outer surface of the meter roller comprises alternating blank portions with no recesses and metering portions defining the recesses, such that each metering portion is between two blank portions and each blank portion is between two metering portions, and wherein each metering portion is aligned with one of the troughs such that granular material moved over the metering edge by one of the metering portions falls into a corresponding trough.

6. The apparatus of claim 1 comprising a gate movable, when the metering module is mounted in the bottom hopper opening, from an open position out of the bottom hopper opening to a closed position blocking the bottom hopper opening, and wherein when the metering module is removed from the bottom hopper opening with the gate in the closed position, the gate prevents granular material from flowing out of the hopper through the bottom hopper opening.

7. The apparatus of claim 6 comprising a clean out tray adapted to be attached in the bottom hopper opening after the metering module is removed from the bottom hopper opening with the gate in the closed position, and configured, when attached, to direct granular material, released from the hopper by moving the gate toward the open position, into a narrow stream for collection.

8. The apparatus of claim 1 comprising:
a first metering module with a first meter roller defining a plurality of first recesses on an outer surface thereof and a front metering member providing a metering edge spaced at a first metering gap distance from the outer surface of the first meter roller; and
a second metering module with a second meter roller defining a plurality of second recesses on an outer surface thereof and a front metering member providing a metering edge spaced at a second metering gap distance from the outer surface of the second meter roller.

9. The apparatus of claim 1 comprising:
a lower material metering assembly and an upper material metering assembly located above the lower material metering assembly;
wherein the venturi devices of the distribution assembly are attached to the bottom portion of the hopper of the lower material metering assembly; and
wherein the flow structure of the upper material metering assembly directs received granular into the product input openings of the distribution assembly through a connector structure connecting the flow structure of the upper material metering assembly to the flow structure of the lower material metering assembly.

10. The apparatus of claim 9 wherein the connector structure is attached to the flow structure of the upper material metering assembly and to the flow structure of the lower material metering assembly to form a removable flow connecting assembly.

11. The apparatus of claim 1 comprising:
a product tank mounted on an air seeder and configured for movement along the ground in an operating travel direction, and a feed aperture in a bottom of the product tank;
a right material metering assembly wherein the hopper of the right material metering assembly is attached to a right side of the bottom of the product tank and configured to receive granular material from the feed aperture;
a right distribution assembly mounted under the right material metering assembly;
a left material metering assembly wherein the hopper of the left material metering assembly is attached to a left side of the bottom of the product tank and configured to receive granular material from the feed aperture;
a left distribution assembly mounted under the left material metering assembly;
wherein the air supply conduit of the right distribution assembly is connected to the air supply conduit of the left distribution assembly such that pressurized air flows through the air supply conduits of both the right and left distribution assemblies;
a right meter drive operative to selectively rotate the meter roller of the right material metering assembly; and
a left meter drive operative to selectively rotate the meter roller of the left material metering assembly.

12. The apparatus of claim 11 wherein the air supply conduits of the right and left material metering assemblies are attached to the corresponding hoppers with longitudinal axes thereof aligned.

13. An air seeder tank system configured for travel in an operating travel direction, the system comprising:
a main product tank and a main feed aperture in a bottom of the main product tank;
a plurality of material metering assemblies, each material metering assembly comprising a hopper with a bottom hopper opening, and a metering module removably mounted in the bottom hopper opening, the metering module comprising:
a meter roller oriented substantially horizontally and configured such that when granular material is placed in the hopper, the granular material is in contact with a rear side of the meter roller;
the meter roller defining a plurality of recesses on an outer surface thereof and driven such that during operation a bottom side of the meter roller moves forward;
a front metering member mounted forward of a lower portion of the meter roller and providing a metering edge that is parallel to the outer surface of the meter roller and spaced at a fixed metering gap distance from the outer surface of the meter roller;
a bottom plate extending forward from the hopper under the meter roller to the front metering member and configured to contain granular material such that granular material moves out of the hopper only over the metering edge; and
a removable flow structure operative to receive granular material flowing over the metering edge and to direct the received granular into a distribution assembly;
wherein the plurality of material metering assemblies includes right and left main material metering assemblies with hoppers thereof attached to corresponding right and left bottom sides of the main product tank and configured to receive granular material from the main feed aperture;
right and left distribution assemblies mounted under the corresponding right and left main material metering assemblies, each distribution assembly comprising a plurality of venturi devices attached to a bottom portion of the corresponding hopper and spaced along the corresponding bottom hopper opening under the corresponding metering module and an air supply conduit carrying pressurized air, wherein each venturi device is connected at an air input end thereof to the air supply conduit and is connected at an output end thereof to a distribution conduit, and each venturi device defines a product input opening between the air input end thereof and the output end thereof, and wherein the corresponding flow structure is operative to direct the received granular material substantially equally into each of the corresponding product input openings;
wherein the air supply conduit of the right distribution assembly is connected to the air supply conduit of the left distribution assembly such that pressurized air flows through the air supply conduits of both the right and left distribution assemblies;
a right main meter drive operative to selectively rotate the meter roller of the right main material metering assembly; and
a left main meter drive operative to selectively rotate the meter roller of the left main material metering assembly.

14. The system of claim 13 comprising:
a secondary product tank and a secondary feed aperture in a bottom of the secondary product tank;
wherein the plurality of material metering assemblies comprises right and left secondary material metering assemblies with hoppers thereof attached to corresponding right and left bottom sides of the secondary product tank and configured to receive granular material from the secondary feed aperture, and wherein the right and left secondary material metering assemblies are mounted above the corresponding right and left main material metering assemblies;

wherein the flow structure of each of the right and left secondary material metering assemblies is operative to direct the received granular material substantially equally into each of the product input openings of the corresponding right and left distribution assemblies;

a right secondary meter drive operative to selectively rotate the meter roller of the right secondary material metering assembly; and a left secondary meter drive operative to selectively rotate the meter roller of the left secondary material metering assembly.

15. The system of claim 14 comprising a meter drive control connected to the right and left main meter drives and to the right and left secondary meter drives and configured, when in a first mode, to operate the right main and secondary meter drives together, and to operate the right main and secondary meter drives together, independent of each other.

16. The system of claim 15 wherein the meter drive controller is configured, when in a second mode, to operate the right and left main meter drives together, and to operate the right and left secondary meter drives together, independent of each other.

17. The system of claim 13 wherein the flow structures comprise a corrugated plate defining a plurality of troughs, each trough having an upper end oriented to receive granular material flowing over the metering edge and a lower end oriented to direct granular material into a corresponding one of the product openings.

18. The system of claim 17 wherein the front metering members are provided by a cylindrical rod, and the metering edges are provided by a top edge of the rod.

19. The system of claim 18 comprising a guide plate attached to a front side of each rod and extending upward, the guide plate defining a plurality of generally U-shaped openings, each U-shaped opening having a bottom end forward of and below the top edge of the rod, and an open upper end, each U-shaped opening aligned with the upper end of a corresponding trough.

20. The system of claim 15 wherein the outer surface of each meter roller comprises alternating blank portions with no recesses and metering portions defining the recesses, such that each metering portion is between two blank portions and each blank portion is between two metering portions, and wherein each metering portion is aligned with one of the troughs such that granular material moved over the metering edge by one of the metering portions falls into a corresponding trough.

* * * * *